US010669215B2

(12) United States Patent
Stevens et al.

(10) Patent No.: US 10,669,215 B2
(45) Date of Patent: Jun. 2, 2020

(54) SNAP-SET, READY-MIX JOINT COMPOUND

(75) Inventors: Richard B. Stevens, Crystal Lake, IL (US); Charles J. Miller, Johnsburg, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 644 days.

(21) Appl. No.: 12/621,835

(22) Filed: Nov. 19, 2009

(65) Prior Publication Data
US 2010/0175590 A1 Jul. 15, 2010

Related U.S. Application Data

(60) Provisional application No. 61/144,552, filed on Jan. 14, 2009.

(51) Int. Cl.
*C04B 28/04* (2006.01)
*C04B 40/06* (2006.01)
*C04B 28/14* (2006.01)
C04B 7/34 (2006.01)
C04B 7/00 (2006.01)
C04B 28/00 (2006.01)
C04B 32/00 (2006.01)
C04B 2/10 (2006.01)
C04B 9/04 (2006.01)
C04B 11/00 (2006.01)
C04B 111/10 (2006.01)
C04B 111/00 (2006.01)

(52) U.S. Cl.
CPC ........ *C04B 40/0658* (2013.01); *C04B 28/145* (2013.01); *C04B 2111/00112* (2013.01); *C04B 2111/00689* (2013.01); *C04B 2111/10* (2013.01)

(58) Field of Classification Search
USPC ....... 106/699, 780, 782, 787, 773, 690, 798, 106/799, 815, 638, 772, 778, 785; 524/8, 524/2, 5
See application file for complete search history.

(56) References Cited

U.S. PATENT DOCUMENTS

| | | | |
|---|---|---|---|
| 1,338,117 A | 4/1920 | Adamson | |
| 2,031,898 A * | 2/1936 | Marsh | 423/172 |
| 2,216,555 A | 10/1940 | King et al. | |
| 4,454,267 A * | 6/1984 | Williams | C04B 26/04 252/378 P |
| 5,653,797 A * | 8/1997 | Patel | C04B 24/2652 106/778 |
| 5,746,822 A * | 5/1998 | Espinoza | C04B 22/142 106/785 |
| 5,779,786 A | 7/1998 | Patel | |
| 6,379,458 B1 | 4/2002 | Immordino et al. | |
| 6,406,537 B1 | 6/2002 | Immordino | |
| 6,740,395 B2 * | 5/2004 | Halm | C04B 28/14 106/772 |
| 6,805,741 B1 | 10/2004 | Liu et al. | |
| 6,884,830 B1 * | 4/2005 | Hornaman | C04B 28/14 524/4 |
| 7,150,787 B2 | 12/2006 | Clamen et al. | |
| 7,256,227 B2 | 8/2007 | Stone | |
| 2003/0134554 A1 | 7/2003 | Halm et al. | |
| 2005/0161853 A1 | 7/2005 | Miller et al. | |
| 2008/0160340 A1 | 7/2008 | Stocco | |
| 2008/0229981 A1 * | 9/2008 | Liu | C04B 28/146 106/778 |
| 2009/0047545 A1 * | 2/2009 | Yu | C04B 22/16 428/703 |

FOREIGN PATENT DOCUMENTS

| | | | |
|---|---|---|---|
| CA | 2788841 A1 | 8/2011 | |
| CN | 1155878 A | 7/1997 | |
| JP | 61-127656 | 11/1984 | |
| JP | 06-330023 | 11/1994 | |
| JP | 08-060139 | 3/1996 | |
| JP | 2007-522067 | 8/2007 | |
| KR | 10-0382873 | 9/2003 | |
| KR | 10-2006-0125872 | 12/2006 | |
| TW | 200930681 | 7/2009 | |
| WO | WO 2005072948 A1 * | 8/2005 | |
| WO | WO-2005072948 A1 * | 8/2005 | ........... C04B 11/024 |
| WO | WO 2008/082566 | 7/2008 | |

OTHER PUBLICATIONS

"Material Safety Data Sheet: Calcium Sulfate Hemihydrate". Fisher Scientific. Nov. 8, 2007 [Retrieved on Mar. 14, 2012]. Retrieved from http://fscimage.fishersci.com/msds/04084.htm.*
Office Action for Argentine Application No. 20100100335 dated Oct. 4, 2017.

* cited by examiner

*Primary Examiner* — James E McDonough
(74) *Attorney, Agent, or Firm* — Greer, Burns & Crain, Ltd.; Philip Petti; Pradip Sahu

(57) ABSTRACT

A joint compound system includes a set-inhibited, pre-wetted, setting-type, ready-mix joint compound and a set initiator. The set-inhibited, pre-wetted, setting-type joint compound includes a ready-mixed, setting-type joint compound base with a calcium-free phosphate set preventing agent that impedes chemical hydration of a gypsum component of the setting-type joint compound. The joint compound base is free of calcium carbonate. The set initiator includes alum to reinitiate the chemical hydration reactions.

13 Claims, No Drawings

SNAP-SET, READY-MIX JOINT COMPOUND

CROSS REFERENCE TO A RELATED APPLICATION

This application claims the benefit under 35 U.S.C. § 119 (c) of provisional application U.S. Ser. No. 61/144,552, filed Jan. 14, 2009, herein incorporated by reference.

FIELD OF THE INVENTION

This invention relates to a ready-mix joint compound. More specifically, it relates to a joint compound that chemically hardens quickly and reliably within a stated time.

BACKGROUND OF THE INVENTION

Walls made from gypsum wallboard are conventionally constructed by attaching the wallboard panels to studs, and filling and coating the joints between the panels with a specially formulated composition called a joint compound. The wetted joint compound (drying type; taping grade) is placed within the joint formed by the abutting edges of the wallboard panels, and a paper reinforcing tape is embedded in the joint with the joint compound which is then permitted to dry. When the joint compound is dry, a second joint compound (topping or finishing grade) is applied over the joint, and it too is permitted to dry. It is usually necessary for a third application of a joint compound and, after it is dry, it may be lightly sanded and may be conventionally finished with a decorative material (paint, texture or wallpaper) then applied to the wall. Instead of using two grades of joint compound, an all purpose joint compound is commercially available which is used both for embedding the tape and for the finish coat(s). If a fiberglass reinforcing tape is used, it is applied to the wall prior to the application of joint compound and is used with chemically setting type joint compound. For the taping step the setting type joint compound is applied over the fiberglass tape and forced through the tape.

Conventionally, all joint compounds contain a filler, a binder and a thickener. The taping grade joint compound generally contains more binder than the topping grade. The conventional fillers are calcium carbonate, calcium sulfate dihydrate (gypsum), and calcium sulfate hemihydrate (plaster of Paris). The calcium sulfate hemihydrate is used only in setting type joint compounds as disclosed in U.S. Pat. No. 3,297,601. In current construction practices, generally it is preferred to use a ready-mixed, pre-wetted, drying type joint compound which contains either a calcium carbonate or gypsum filler. The ready-mixed, pre-wetted, drying type joint compounds are preferred for the convenience of avoiding the problems of mixing powdered materials into water at a jobsite: airborne dust, messy floors and workspace, lump removal to achieve a smooth mixture, and extra time. However, these conventional drying-type joint compounds encounter shrinkage during drying which make it more difficult to achieve a smooth wall surface, and each coat of drying type joint compound must dry thoroughly before additional coats can be applied.

In order to overcome the disadvantages of the drying-type joint compounds, setting-type joint compounds possess inherently low shrinkage and can be recoated after setting allowing for faster construction. Powdered setting-type joint compounds have the disadvantage of needing to be drill mixed with water on the jobsite at the time of use. Jobsite drill mixing of powdered compounds generates excess dust and mess, eliminating lumps to achieve a smooth mixture can be difficult and more time is needed compared to using a ready-mixed compound. The prior art in U.S. Pat. No. 5,746,822, herein incorporated by reference, discloses a ready-mixed, setting type joint compound. Set preventers are useful for interrupting the chemical conversion of calcium sulfate hemihydrate to calcium sulfate dihydrate. The ability to interrupt the chemical setting process enables the production of a setting-type joint compound that is in a ready-mixed form instead of a powder. Setting reactions that had been interrupted in the ready mixed setting compound through the use of a set preventer can be made to resume upon addition of a set activator. The advantages of a preferred ready-mixed, pre-wetted product are thus incorporated into a product with the shrinkage and recoating advantages of a setting type joint compound. U.S. Pat. No. 5,746,822, describes a two component composition with a premixed, cementitious component comprising a wetted calcium sulfate hemihydrate, conventional joint compound binders and thickeners, and a set preventer for a cementitious base. The other component, a set activator such as zinc sulfate, restarts the chemical setting reactions previously interrupted by the set preventer. Zinc sulfate is a slow-acting set activator. Even when used in relatively large amounts, joint compounds activated with zinc sulfate take long times to chemically harden in strength. Applicators must wait for the joint compound coat to be sufficiently firm and hard for application of a subsequent coat, sometimes until the following day.

Alum is known as a chemical set accelerator for calcium sulfate hemihydrate systems. It hastens setting hydration reactions in mixtures of calcined gypsum and water. However, alum is rarely used because excessive foam is generated in the presence of calcium carbonate. Calcium carbonate can be present either as a naturally occurring contaminant of other raw materials or as an added component. In joint compounds, this type of foam generation causes loss of strength and surface cratering. In addition, dramatic volumetric expansion from generation of the foam can cause the joint compound to expand up and out of the mixing pail, and if the expansion continues after the compound has been applied to the wallboard surface, the finished joint can expand to create unsightly convex jointwork (crowned joints). The teachings of the prior art teach away from using alum in stuccos containing calcium carbonate, but refrain from suggesting any other solution to the problem.

SUMMARY OF THE INVENTION

At least one of these advantages is realized by a joint compound system that includes a set-inhibited, pre-wetted, setting-type joint compound formulated with additives to allow delivery to the customer as a ready-mix joint compound, and a separate set initiator. This invention combines the use of a potent set initiator with the pre-wetted, setting-type joint compound made without calcium carbonate to produce quick, strong setting action without overfoaming.

The set-inhibited, pre-wetted, setting-type joint compound includes a ready-mixed, setting-type joint compound base and a calcium-free phosphate set preventing agent that impedes chemical hydration of a gypsum component of the setting-type joint compound. The joint compound base is free of calcium carbonate. The set initiator includes alum to resume the chemical hydration reactions.

Surprisingly, it has been found that alum can be used without excessive foaming as a set initiator with a ready-mixed, setting-type joint compound base to which a set preventer has been added. The joint compound system utilizes a combination of a calcium-free phosphate set preventer, alum as a set initiator and a limited amount of calcium carbonate in the joint compound base. This combination of features provides a long-lasting set prevention to provide the ready mixed functionality, rapid set initiation upon addition of the alum set initiator, and a smooth and creamy texture without excess foaming to the joint compound.

The ability to use alum as a set initiator without encountering the over-foaming issue generates several advantages. The rate of set and hardening is considerably faster and much stronger using the alum set initiator compared to prior art zinc compounds. This allows for a "snap set" whereby the joint compound sets quickly and is ready to be recoated or sanded very soon after it is applied to wall or ceiling panels. This composition further has the advantage that a joint compound can be prepared that is substantially free of foam while generating the desirable snap-set performance not obtained in the prior art. Additionally, alum allows the use of far less set activator than when using the prior art zinc sulfate, which allows for easier incorporation of the set activator into the pre-wetted setting type base. The reduced usage allows dramatically less weight and volume of set activator needed on the jobsite, and allows the set activator to be marketed in a much less bulky concentrated form.

DETAILED DESCRIPTION OF THE INVENTION

A joint compound system for a setting-type joint compound has been developed having excellent shelf life in a ready-mixed state and fast setting times after an activating agent has been added. This system includes a set-inhibited, pre-wetted, setting-type joint compound and a separate portion of alum that is added at the time the joint compound system is to be used.

The set-inhibited, pre-wetted, setting-type joint compound is a ready-mix, setting-type joint compound base in which the cementitious setting reactions have been deactivated, prevented or suspended. One key ingredient in the pre-wetted setting type joint compound is a long term set preventing agent that maintains the ready-mixed, hydraulic base in an unset state. The presence of water would normally hydrate the calcium sulfate hemihydrate within 0.1 to 5 hours in a set time controlled by retarder additives. The additives that have been discovered to provide the long term set prevention effect in ready-mixed, cementitious compositions are non-calcium bearing phosphates. In particular, (1) zinc hexametaphosphate and (2) potassium tripolyphosphate have been found to provide the long term set prevention effect, with (3) tetra sodium pyrophosphate providing the most long lasting set prevention effect. Other effective set preventing agents include (4) sodium tripolyphosphate, (5) monoammonium phosphate and (6) monobasic potassium phosphate. Generally, the set prevention effect is provided by low levels of the phosphate additive, in amounts ranging from about 0.1 to about 2% by weight based on the total composition weight excluding the water. In some embodiments the phosphate additive is present in amounts of about 0.1 to about 0.6% based on the total composition weight excluding the water. The phosphate set preventer is optionally a water soluble salt of the phosphate excluding calcium salts of the phosphate. As used herein, the term "calcium-free phosphate set preventer" specifically excludes calcium salts of the set preventing compounds.

The phosphate set preventing agents are used in place of or in addition to conventional set retardation additives. An example of a useful set retarder is a proteinaceous retarder, such as SUMA set retarder. Some embodiments of the joint compound base utilize about 0.02% to 1% of the retarder, while some embodiments utilize 0.02% to 0.1% based on the weight of the dry ingredients. The set retarders are used singly or in combination with one another in any useful amount. The addition of conventional set retarders has little effect on the long term set prevention as provided by the non-calcium bearing phosphates, but conventional set retarders aids in controlling the set time of the ready mixed setting type joint compound once the set initiator has been used to restart the hydration reactions.

Another principal ingredient in the joint compound base is the gypsum component, such as calcium sulfate hemihydrate filler. It has been found that the alpha crystalline form of the calcium sulfate hemihydrate is preferred for long term maintenance of an unset, ready-mixed composition containing the non-calcium bearing phosphates. In general, at least about twenty percent (20%) by weight of the dry joint compound base is calcium sulfate hemihydrate, which may range up to about ninety-nine percent (99%) by weight, more preferably 60% to about 90% of the dry ingredients. Other forms of calcium sulfate hemihydrate are also useful, including the beta crystalline form and/or mixtures of the alpha and beta forms.

Calcium carbonate is known to be present in landplaster, the freshly mined calcium sulfate source. The calcium carbonate is often present in calcium sulfate hemihydrate as a contaminant. For many uses the calcium carbonate is an inert filler and poses no problems. However, when calcium carbonate and water are combined with alum, adverse effects have been observed, including excess foaming. For use in the joint compound base to be used with an alum activator, it is critical that the calcium sulfate hemihydrate be substantially free of calcium carbonate. Calcium sulfate hemihydrate that is "substantially free" of calcium carbonate means that the hemihydrate has less than 2% by weight of the calcium carbonate. Some embodiments of the calcium sulfate hemihydrate include less than 1% or even less than 0.5% calcium carbonate. In at least one embodiment, the calcium sulfate hemihydrate is free of calcium carbonate.

When calcium carbonate is absent from the joint compound base, in some embodiments an inert filler is optionally used as a bulking agent. A preferred inert filler is talc. Since it is about the same density as calcium carbonate, the calcium carbonate can be replaced by equal amounts of talc, resulting in only minor changes in the density of the joint compound base. Other fillers are also acceptable; however, the relative amounts of other ingredients in the joint compound base will also require adjustment to maintain the desired joint compound density.

In preparing the joint compound base, other conventional joint compound ingredients may be incorporated into the composition. A latex emulsion binder is an important ingredient which is well known to those skilled in the joint compound art. Any of the conventional latex binders may be used, with polyvinyl acetate and ethylene vinyl acetate emulsions being preferred. If present, the latex binder ranges from about 0.5% to about 15% by weight of the composition prior to adding water, with some embodiments using 1% to about 8%. The use of spray-dried binders is also contemplated.

It is generally preferred that the joint compound base include one or more thickeners. Conventional cellulosic thickeners, e.g. ethylhydroxy ethylcellulose, hydroxypropyl methylcellulose, methylhydroxypropyl cellulose, hydroxyethyl cellulose and mixtures thereof, may be used in the joint compounds of this invention. The amount of cellulosic thickener, if present, may range from about 0.1% to about 3%, preferably 0.3 to 1% by weight of the total composition ingredients not including the water added. It is contemplated that other thickeners will be used instead of or in addition to the cellulosic thickener.

The joint compound base of this invention may also contain a non-leveling agent such as attapulgus clay. This ingredient provides non-leveling, slip and water retention. It has been found that attapulgus clay provides a joint compound having good working properties, and use of attapulgus clay assists in long term suspension and stability of a ready mixed setting joint compound per U.S. Pat. No. 3,297,601. In general, the amount of the non-leveling agent, if present, ranges from about 1% to about 10%, preferably 2% to 7% by weight of the base composition prior to adding water. Other clays such as sepiolite, bentonite and montmorillonite may also be used in the joint compound base, in addition to or instead of the clay.

Conventional ready-mixed joint compounds frequently contain fillers, such as diatomaceous earth, mica, talc, or sericite to provide resistance to cracking upon drying. These ingredients can be omitted from the joint compound base of this invention which has excellent resistance to cracking without using mica or talc; however, it may be desired to include minor amounts of mica or talc in the formulation to provide improved slip and workability. When used in the joint compound base of this invention, the mica or talc may be between about 2% and about 15% by weight of the composition prior to adding water.

It is preferred that the joint compounds of this invention have a pH in the range of 7-8. In some cases it may be necessary to use an additive, such as citric acid, to lower the pH. In general, the pH control additive may be present in amounts ranging from 0.1-1% by weight of the joint compound composition.

Additional ingredients frequently used in joint compounds are contemplated for use in the present joint compound system. These ingredients optionally include, but are not limited to humectants, fillers, wetting agents, kaolin, defoamers and plasticizers are also useful in the instant joint compound base.

If a lightweight, ready-mixed joint compound is desired, the lightweight property can be provided by incorporating an expanded perlite into the joint compound base in accordance with the disclosure in U.S. Pat. No. 4,454,267. It is well known in the art that it is preferred that the expanded perlite should have a particle size which will pass through a 100 mesh screen if it is to be incorporated into a joint compound base. In a ready-mixed joint compound, the expanded perlite is optionally treated to render it water-insensitive or left uncoated. If it is advantageous to treat the expanded perlite, there are several ways to render the expanded perlite water-insensitive, one of which is disclosed in U.S. Pat. No. 4,525,388. Another method is to treat the expanded perlite with a silicone or siloxane compound, but other materials may be used to render it water-insensitive (i.e., water-repellent). Specially treated expanded perlite is commercially available from suppliers such as Silbrico Corporation.

In order to achieve the desired lightweight properties, the expanded perlite should be present in amounts of at least about 3% by weight of all of the ingredients in the ready-mixed cementitious compound, excluding the water. It is particularly preferred that the expanded perlite be present in amounts between about 5% and about 10% by weight of all of the ingredients in the joint compound, excluding the water.

Water is added in amounts selected to produce a joint compound of a desired viscosity. Some embodiments of the invention target a Brabender viscosity of between 200-400 Brabender Units. The measurements are based on using type A probe and 250 cmg torque head.

When preparing a ready-mix joint compound, it is necessary to provide for control microbial growth in the wet medium during storage. One method of reducing microbes is by introducing a biocide that kills on contact to shock the joint compound base. Examples of contact-kill biocides include household bleach (6% aqueous sodium hypochlorite) or chemicals for shock treatment of swimming pools, such as lithium or calcium hypochlorite. Although these additives will kill essentially all microbes present in the joint compound base at the time of manufacture, they will not prevent future microbial growth.

Conventional in-can preservatives, including MERGAL 174 and/or FUNGITROL 158, are used for continuing suppression of microbial growth. They can be used in combination with or in place of the contact-kill treatments. Combinations of preservatives are also contemplated.

The second component of the joint compound system is alum. This component serves to activate the pre-wetted setting type joint compound, restarting the calcium sulfate hemihydrate/water hydration reactions to chemically harden the joint compound. "Alum" means any aluminum sulfate, including aluminum disulfate, a double sulfate of potassium and aluminum and a double sulfate of aluminum and ammonia. Hydrated forms of alum are also contemplated. The amount of activator used can be reduced when alum is used. Alum is used in amounts of about 0.5 grams to about 2 grams, based on 100 grams of ready mixed joint compound.

The ready-mixed cementitious composition of this invention is capable of functioning as a setting type joint compound when a set activator is added to initiate the setting action at the time of use. The accelerator overcomes the effect of the phosphate set preventer and enables the calcium sulfate hemihydrate to hydrate and chemically set and harden. After addition of the set activator to the wet mixed joint compound, hydration reactions occur (calcium sulfate hemihydrate becomes calcium sulfate dihydrate), producing a hard set article in a matter of minutes or hours.

Example I

A pre-wetted set-inhibited, setting-type, ready-mix joint compound was prepared using the components of Table 1. #1 Shock refers to a dry calcium hypochlorite shocking agent as commonly used in swimming pools. Bleach refers to household bleach, which is about a 6% aqueous solution of sodium hypochlorite. Both bleach and pool shock are used as contact-kill biocides.

TABLE 1

COMPOSITION OF SETTING-TYPE, READY-MIX JOINT COMPOUNDS

| Component | Control Joint Compound, wt % of Dry components | Inventive Joint Compound, wt % of Dry Components |
|---|---|---|
| α-Calcium Sulfate Hemihydrate | 66.758 | 66.520 |
| Hubercarb Q200 calcium | 16.820 | 0 |

TABLE 1-continued

COMPOSITION OF SETTING-TYPE, READY-MIX JOINT COMPOUNDS

| Component | Control Joint Compound, wt % of Dry components | Inventive Joint Compound, wt % of Dry Components |
|---|---|---|
| carbonate | | |
| Talcron MP 45-26 talc | 0 | 16.820 |
| Silbrico 35-23 expanded perlite | 6.970 | 6.970 |
| Gel B attapulgite clay | 4.9980 | 4.980 |
| Methocel J12MS cellulosic thickener | 0.500 | 0.500 |
| Suma proteinaceous set retarder | 0.050 | 0.050 |
| tetrasodiumpyrophosphate set inhibitor | 0.200 | 0.200 |
| Citric Acid | 0.100 | 0.100 |
| Celvol 205-S polyvinyl alcohol | 0.200 | 0.200 |
| #1 shock (68%) | 0.260 | 0 |
| Bleach (6.15%) | 0 | 0.260 |
| Halltech 41-830 polyvinyl acetate emulsion | 3.000 | 3.000 |
| Mergal 174 biocide | 0.200 | 0.200 |
| Fungitrol 158 biocide | 0.200 | 0.200 |
| Total Wt. Dry Components | 1497.75 | 1497.75 |
| Water | 925 | 965 |

For both of the above compositions, the joint compound base was made by weighing the dry components and combining them in a vessel. The dry ingredients included calcium sulfate hemihydrate, calcium carbonate or talc, perlite, thickeners and retarders.

Water was weighed and placed into a second vessel. For the present examples, the target Brabender viscosity was 250. The remaining wet ingredients were also weighed and added to the water, the wet ingredients including the latex emulsion and preservatives.

Wet and dry components were then combined to form the ready-mixed joint compound. Setting of the joint compound was inhibited until a later time when alum was added in the amounts stated in Table I.

The joint compounds were tested for set times and the data is presented in Table II. References to Vicat set time refer to ASTM C-472, herein incorporated by reference. The Vicat set time was started at the time the alum was added to the ready-mixed joint compound. A sample of 100 grams of ready-mixed joint compound was mixed with the stated amount of alum. The sample was poured onto an acrylic sheet to form a patty. A 300 gram Vicat needle was held half way between the center and the outer edge of the patty, perpendicular to the patty surface. The needle was held to the patty surface and released to fall freely of its own weight. Set time was determined when the needle failed to penetrate to the bottom of the patty.

The recoat set time was the time until the joint compound was firm enough to resist deformation while recoating. As a setting-type joint compound hydrates, the temperature rises as the reaction proceeds. Higher temperatures reflect faster set times.

TABLE II

PERFORMANCE DATA

| Alum/Joint Compound Ratio | Property | Control Joint Compound | Inventive Joint Compound |
|---|---|---|---|
| 1.75 g Alum/100 g Joint Compound | Recoat set time, min | 20 | 18 |
| | Vicat set time, min. | 23 | 20 |
| | Vicat Temperature, ° F. | 98 | 93 |
| | Mixing Comments | Frothy/Expands | Smooth/Creamy |
| 0.80 g Alum/100 g Joint Compound | Recoat set time, min | 55 | 48 |
| | Vicat set time, min. | 60 | 53 |
| | Vicat Temperature, ° F. | 94 | 96 |
| | Mixing Comments | Frothy/Expands | Smooth/Creamy |
| 0.60 g Alum/100 g Joint Compound | Recoat set time, min | 88 | 91 |
| | Vicat set time, min. | 95 | 95 |
| | Vicat Temperature, ° F. | 87 | 87 |
| | Mixing Comments | Frothy/Expands | Smooth/Creamy |

A comparison of the a conventional joint compound with the joint compound of this invention shows faster set times are obtained with the inventive joint compound, even when the same set initiating compound, i.e. alum, is used. This is confirmed by the recoat set time, Vicat set time and Vicat temperature.

Further, an improved product is obtained that is smooth and creamy during mixing. No foam is generated during mixing and there is no product expansion.

While a particular embodiment of the ready-mix joint compound has been shown and described, it will be appreciated by those skilled in the art that changes and modifications may be made thereto without departing from the invention in its broader aspects.

We claim:

1. A joint compound composition comprising:
   alum in an amount from 0.8% to 2% by weight of the joint compound composition;
   a calcium-free phosphate set-preventing agent in an amount from about 0.1% to about 2% by weight of the composition excluding the water;
   calcium sulfate hemihydrate having less than about 2% contaminant calcium carbonate by weight of calcium sulfate hemihydrate;
   talc in an amount from about 2% to about 15% by weight of the joint compound composition excluding water;
   a latex emulsion binder in an amount from about 1% to about 15% by weight of the composition excluding water,
   water; and
   wherein the composition does not comprise added calcium carbonate.

2. The joint compound composition of claim 1 wherein said calcium sulfate hemihydrate has less than about 1% contaminant calcium carbonate by weight of calcium sulfate hemihydrate.

3. The joint compound composition of claim 1 wherein said calcium sulfate hemihydrate has less than 0.5% contaminant calcium carbonate by weight of calcium sulfate hemihydrate.

4. The joint compound composition of claim 1 wherein said calcium sulfate hemihydrate is substantially free of contaminant calcium carbonate.

5. The joint compound composition of claim 1, where said latex emulsion binder comprises one of the compounds selected from a group of emulsions or spray dried powders consisting of polyvinyl acetate, polyvinyl alcohol, ethylene vinyl acetate, styrene acrylic, styrene butadiene, and mixtures thereof.

6. The joint compound composition of claim 1 wherein the composition further comprises at least one thickener.

7. The joint compound composition of claim 6 wherein said thickener is cellulosic and present in a range from about 0.1% to about 2% by weight of the total composition ingredients excluding water.

8. The joint compound composition of claim 1 wherein said composition further comprises a non-leveling agent present in a range from about 1% to about 10% by weight of the composition prior to adding water.

9. The joint compound composition of claim 8 wherein said non-leveling agent is selected from the group consisting of sepiolite, bentonite, montmorillonite, attapulgus clay and mixtures thereof.

10. The joint compound composition of claim 1, wherein said base further comprises a pH control additive, and whereby the pH is maintained within a range of about 7 to about 8.

11. The joint compound composition of claim 1 wherein said composition further comprises a wetting agent present in an amount from about 0.05% to about 1.0% by weight of said composition excluding water.

12. The joint compound composition of claim 1 further comprising expanded perlite present in an amount from at least about 3% by weight of said composition before adding the water.

13. The joint compound composition of claim 1, wherein the calcium-free phosphate set-preventing agent comprises zinc hexametaphosphate, potassium tripolyphosphate, tetra sodium pyrophosphate, sodium tripolyphosphate, monoammonium phosphate, monobasic potassium phosphate or any combination thereof.

* * * * *